US007819962B2

(12) United States Patent
Gu

(10) Patent No.: US 7,819,962 B2
(45) Date of Patent: Oct. 26, 2010

(54) MODIFIED PIGMENTS HAVING REDUCED PHOSPHATE RELEASE, AND DISPERSIONS AND INKJET INK COMPOSITIONS THEREFROM

(75) Inventor: Feng Gu, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 12/381,608

(22) Filed: Mar. 13, 2009

(65) Prior Publication Data

US 2009/0229489 A1 Sep. 17, 2009

Related U.S. Application Data

(60) Provisional application No. 61/069,700, filed on Mar. 17, 2008.

(51) Int. Cl.
*C09D 11/00* (2006.01)
(52) U.S. Cl. .................................. 106/31.6; 106/31.75
(58) Field of Classification Search ................ 103/31.6, 103/31.75
See application file for complete search history.

(56) References Cited

U.S. PATENT DOCUMENTS

| | | | |
|---|---|---|---|
| 3,446,641 A | 5/1969 | Mitchell et al. |
| 3,532,662 A | 10/1970 | Ansdell |
| 4,150,020 A | 4/1979 | Swidler et al. |
| 4,491,481 A | 1/1985 | Robertson et al. |
| 4,698,431 A | 10/1987 | Raymond et al. |
| 5,281,261 A | 1/1994 | Lin |
| 5,500,141 A | 3/1996 | Kormann et al. |
| 5,624,901 A | 4/1997 | Raymond et al. |
| 5,630,868 A | 5/1997 | Belmont et al. |
| 5,672,198 A | 9/1997 | Belmont |
| 5,698,016 A | 12/1997 | Adams et al. |
| 5,707,432 A | 1/1998 | Adams et al. |
| 5,708,095 A | 1/1998 | Page et al. |
| 5,713,993 A | 2/1998 | Page et al. |
| 5,750,594 A | 5/1998 | Page et al. |
| 5,795,376 A | 8/1998 | Ide |
| 5,803,959 A | 9/1998 | Johnson et al. |
| 5,837,045 A | 11/1998 | Johnson et al. |
| 5,885,335 A | 3/1999 | Adams et al. |
| 5,922,118 A | 7/1999 | Johnson et al. |
| 5,958,999 A | 9/1999 | Bates et al. |
| 6,042,643 A | 3/2000 | Belmont et al. |
| 6,150,433 A | 11/2000 | Tsang et al. |
| 6,187,086 B1 | 2/2001 | Rehman |
| 6,203,909 B1 | 3/2001 | Chassot |
| 6,204,307 B1 | 3/2001 | Miyabayashi |
| 6,210,473 B1 | 4/2001 | Boils et al. |
| 6,214,100 B1 | 4/2001 | Parazak et al. |
| 6,221,476 B1 | 4/2001 | Bruening et al. |
| 6,221,932 B1 | 4/2001 | Moffatt et al. |
| 6,281,267 B2 | 8/2001 | Parazak |
| 6,323,257 B1 | 11/2001 | Moffatt et al. |
| 6,328,894 B1 | 12/2001 | Chan et al. |
| 6,395,805 B1 | 5/2002 | Takao |
| 6,458,458 B1 | 10/2002 | Cooke et al. |
| 6,506,706 B1 | 1/2003 | Bruening et al. |
| 6,533,851 B2 | 3/2003 | Lee et al. |
| 6,538,047 B1 | 3/2003 | Miyabayashi |
| 6,544,422 B2 | 4/2003 | Tarbet et al. |
| 6,585,817 B2 | 7/2003 | Lee et al. |
| 6,592,657 B2 | 7/2003 | Lee et al. |
| 6,623,644 B2 | 9/2003 | Bruening et al. |
| 6,641,653 B2 | 11/2003 | Yu |
| 6,641,656 B2 | 11/2003 | Yu et al. |
| 6,653,367 B2 | 11/2003 | Miyabayashi |
| 6,719,905 B2 | 4/2004 | Bruening et al. |
| 6,723,783 B2 | 4/2004 | Palumbo et al. |
| 6,814,789 B2 | 11/2004 | Uhlir-Tsang et al. |
| 6,831,194 B2 | 12/2004 | Srinivas |
| 6,833,026 B2 | 12/2004 | Palumbo |
| 6,866,707 B2 | 3/2005 | Kato |
| 6,896,726 B2 | 5/2005 | Bugnon et al. |
| 6,916,367 B2 | 7/2005 | Palumbo |
| 6,960,250 B2 | 11/2005 | Luethge et al. |
| 7,005,004 B2 | 2/2006 | Kalbitz et al. |
| 7,160,377 B2 | 1/2007 | Zoch et al. |
| 7,300,504 B2 | 11/2007 | Shakhnovich |
| 7,347,894 B2 | 3/2008 | Yanagimoto et al. |
| 7,393,403 B2 | 7/2008 | Lee et al. |
| 7,427,361 B2 | 9/2008 | Small et al. |
| 7,459,491 B2 | 12/2008 | Tyvoll et al. |
| 7,501,017 B2 | 3/2009 | Sarkisian et al. |

(Continued)

FOREIGN PATENT DOCUMENTS

| | | |
|---|---|---|
| EP | 0403797 | 12/1990 |
| EP | 1061106 | 8/2003 |
| GB | 2373789 | 6/2004 |
| GB | 2385331 | 4/2005 |
| WO | WO97/12944 | 4/1997 |
| WO | WO2005/090486 | 9/2005 |

(Continued)

OTHER PUBLICATIONS

JP03-193357 to Taiho Ind Co Ltd (Aug. 23, 1991)—Abstract Only.
JP2002-167529 to Konica Corp (Jun. 11, 2002)—Abstract Only.
JP2002-371213 to Mitsubishi Chemicals Corp (Dec. 26, 2002)—Abstract Only.
JP2004-075825 to Fuji Photo Film Co Ltd (Mar. 11, 2004)—Abstract Only.
JP2005-029606 to Color Chemical Kogyo KK (Feb. 3, 2005)—Abstract Only.
JP2005-225955 to Ricoh Co Ltd (Aug. 25, 2005)—Abstract Only.

*Primary Examiner*—Jerry Lorengo
*Assistant Examiner*—Veronica Faison Gee

(57) ABSTRACT

The present invention relates to a modified pigment comprising a pigment having attached at least one geminal bisphosphonic acid group, partial esters thereof, or salts thereof. The modified pigments have a low phosphate release value. Dispersions and inkjet ink compositions comprising these modified pigments are also disclosed.

47 Claims, No Drawings

U.S. PATENT DOCUMENTS

| | | |
|---|---|---|
| 2002/0147252 A1 | 10/2002 | Adams et al. |
| 2006/0089422 A1 | 4/2006 | Vasudevan et al. |
| 2006/0243165 A1 | 11/2006 | Luthge et al. |
| 2007/0044682 A1 | 3/2007 | Nick et al. |
| 2007/0100023 A1* | 5/2007 | Burns et al. ............ 523/160 |
| 2007/0100024 A1* | 5/2007 | Gu et al. ............ 523/160 |
| 2007/0126839 A1 | 6/2007 | Kelly-Rowley et al. |
| 2007/0277699 A1 | 12/2007 | Bauer |
| 2008/0083347 A1 | 4/2008 | Palumbo |

FOREIGN PATENT DOCUMENTS

| | | |
|---|---|---|
| WO | WO2005/123855 | 12/2005 |
| WO | WO2007/053563 | 10/2007 |

* cited by examiner

MODIFIED PIGMENTS HAVING REDUCED PHOSPHATE RELEASE, AND DISPERSIONS AND INKJET INK COMPOSITIONS THEREFROM

CROSS-REFERENCE TO RELATED APPLICATIONS

This patent application claims the benefit of U.S. Provisional Patent Application No. 61/069,700, filed Mar. 17, 2008.

BACKGROUND OF THE INVENTION

1. Field of the Invention.

The present invention relates to a modified pigments having low phosphate release values as well as dispersions and inkjet ink compositions comprising the modified pigments.

2. Description of the Related Art.

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles. A variety of techniques have been developed which can provide stable pigment dispersions that can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 in order to maintain solubility and therefore dispersion stability.

The surface of pigments contains a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. Ink compositions, including inkjet inks, containing these pigments are also described. Also, U.S. Patent Application Publication No. 2007/0100024 discloses modified colorants comprising a colorant having attached at least one organic group, wherein the organic group has a defined calcium index values. Specific embodiments of the organic groups are described, including organic groups comprising at least one geminal bisphosphonic acid group, partial esters thereof, or salts thereof. In addition, U.S. Pat. Nos. 5,672,198, 5,922,118, 6,042,643, and 6,641,656 disclose modified pigments having various attached groups, including phosphonic acid groups.

While these methods provide modified pigments having attached organic groups, there remains a need for modified pigments having improved performance properties in compositions such as inkjet inks, thereby providing advantageous alternatives to previous modified pigments.

SUMMARY OF THE INVENTION

The present invention relates to a modified pigment comprising a pigment having attached at least one organic group, wherein the organic group comprises at least one geminal bisphosphonic acid group, partial esters thereof, or salts thereof. The modified pigment has a phosphate release value of less than or equal to 1% after 1 week at 70° C. For example, the organic group of the modified pigment may comprise at least one group having the formula $-CR(PO_3H_2)_2$, partial esters thereof, or salts thereof, wherein R is H or a C1-C6 alkyl group, such as a group having the formula $-CO-Q-CH(PO_3H_2)_2$ or $-SO_2-Q-CH(PO_3H_2)_2$, partial esters thereof, or salts thereof, wherein Q is O, S, or NR' and R' is H, a C1-C18 alkyl group, a C1-C18 acyl group, an aralkyl group, an alkaryl group, or an aryl group. The modified pigment may be in the form of a dispersion in a liquid vehicle, particularly an aqueous dispersion. The present invention further relates to an inkjet ink composition comprising a liquid vehicle and the modified pigment described herein.

It is to be understood that both the foregoing general description and the following detailed description are exemplary and explanatory only and are intended to provide further explanation of the present invention, as claimed.

DETAILED DESCRIPTION OF THE INVENTION

The present invention relates to modified pigments and to dispersions and inkjet ink compositions comprising modified pigments.

The modified pigment of the present invention comprises a pigment having attached at least one organic group. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or a black pigment, such as carbon black.

The pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$ and most preferably between about 50 $m^2/g$ and about 300 $m^2/g$. If the desired surface area is not readily available for the desired application, it is also well recognized by those skilled in the art that the pigment may be subjected to conventional size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment may also be a pigment that has been oxidized using an oxidizing agent in order to introduce ionic and/or ionizable groups onto the surface. Pigments prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments prepared using other surface modification methods to introduce ionic or ionizable groups onto a pigment surface, such as chlorination and sulfonylation, may also be used.

As described above, the modified pigment of the present invention comprises the pigment having attached at least one organic group. Preferably the organic group is directly attached. The modified pigment may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference.

Such methods provide for a more stable attachment of the groups onto the pigment compared to dispersant type methods, which use, for example, polymers and/or surfactants. Other methods for preparing the modified pigments include reacting a pigment having available functional groups with a reagent comprising the organic group, such as is described in, for example, U.S. Pat. No. 6,723,783, which is incorporated in its entirety by reference herein. Such functional pigments may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

The organic group of the modified pigment comprises at least one geminal bisphosphonic acid group, partial esters thereof, or salts thereof—that is, the organic group may comprise at least two phosphonic acid groups, partial esters thereof, or salts thereof that are directly bonded to the same carbon atom. Such a group may also be referred to as a 1,1-diphosphonic acid group, partial ester thereof, or salt thereof. By "partial ester thereof" is meant that the phosphonic acid group may be a partial phosphonic acid ester group having the formula —$PO_3RH$, or a salt thereof, wherein R is an aryl, alkaryl, aralkyl, or alkyl group. Either or both of the phosphonic acid groups of the organic group may be a partial phosphonic acid ester group. Also, one of the phosphonic acid groups may be a phosphonic acid ester having the formula —$PO_3R_2$ while the other phosphonic acid group may be a partial phosphonic acid ester group, a phosphonic acid group, or a salt thereof. However, it is preferred that at least one of the phosphonic acid groups is either a phosphonic acid, a partial ester thereof, or salts thereof. By "salts thereof" is meant that the phosphonic acid group may be in a partially or fully ionized form having a cationic counterion. Either or both of the phosphonic acid groups of the organic group may be in either a partially or fully ionized form. Thus, the organic group may comprise at least one geminal bisphosphonic acid group, wherein either or both phosphonic acid groups have the formula —$PO_3H_2$, —$PO_3^-M^+$ (monobasic salt), or —$PO_3^{-2}M^{+2}$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl and/or alkyl group. Preferably, at least one of the phosphonic acid groups, and more preferably, both phosphonic acid groups of the geminal bisphosphonic acid group are phosphonic acid groups or salts thereof.

Preferably, the organic group comprises at least one group having the formula —$CR(PO_3H_2)_2$, partial esters thereof, or salts thereof. In this formula, R is H or a C1-C6 alkyl group, such as a methyl or ethyl group, but is preferably H. Such groups have surprisingly been found to have a reduced phosphate release value, which is described in more detail below. For example, the organic group may comprise a group having the formula —CO-Q-$CH(PO_3H_2)_2$ or —$SO_2$-Q-CH$(PO_3H_2)_2$, partial esters thereof, or salts thereof, wherein Q is O, S, or NR' and R' is H, a C1-C18 alkyl group, a C1-C18 acyl group, an aralkyl group, an alkaryl group, or an aryl group. Preferably, Q is NH, and, thus, the organic group comprises at least one alkyl amide group wherein the alkyl group is a geminal bisphosphonic acid group, partial esters thereof, or salts thereof.

As a specific example, the organic group may be a group having the formula —X—CO-Q-CH(PO$_3$H$_2$)$_2$ or —X—SO$_2$-Q-CH(PO$_3$H$_2$)$_2$, partial esters thereof, or salts thereof. In this example, X is attached to the pigment and is an arylene, heteroarylene, alkylene, alkarylene, or aralkylene group. When X is an alkylene group, examples include, but are not limited to, substituted or unsubstituted alkylene groups, which may be branched or unbranched and can be substituted with one or more groups, such as aromatic groups. Specific examples include C1-C12 groups, such as methylene, ethylene, propylene, or butylene groups. Preferably X is an arylene group, such as a phenylene, naphthalene, or biphenylene group. For example, the organic group may be a —C$_6$H$_4$—CONHCH(PO$_3$H$_2$)$_2$ group, a —C$_6$H$_4$—SO$_2$NHCH(PO$_3$H$_2$)$_2$ group, partial esters thereof, or salts thereof. Preferably, X is directly attached to the pigment, meaning there are no additional atoms or groups from the attached organic group between the pigment and X.

X may be further substituted with one or more functional groups. Examples of functional groups include, but are not limited to, R', OR', COR', COOR', OCOR', carboxylates, halogens, CN, NR'$_2$, SO$_3$H, sulfonates, sulfates, NR'(COR'), CONR'$_2$, imides, NO$_2$, phosphates, phosphonates, N=NR', SOR', NR'SO$_2$R', and SO$_2$NR$_2$', wherein, in these formulas, R', which can be the same or different, is independently hydrogen or a branched or unbranched, substituted or unsubstituted, saturated or unsaturated C1-C20 hydrocarbon group, e.g., an alkyl, alkenyl, alkynyl; substituted or unsubstituted aryl, substituted or unsubstituted heteroaryl, substituted or unsubstituted alkaryl, or substituted or unsubstituted aralkyl group.

The modified pigment of the present invention have a defined phosphate release value. As used herein, the term "phosphate release value" refers to a measure of the amount of soluble phosphate ion in the liquid phase of a 15% dispersion of the modified pigment in a liquid vehicle after aging at 70° C. over a specified period of time. The liquid vehicle is described in more detail below. The phosphate release value is expressed as a percentage of the amount of phosphate ion produced (by weight) to the total theoretical amount of phosphate ion that can be produced from the attached bisphosphonic acid groups, partial esters thereof, or salts thereof of the modified pigment (by weight). The amount of phosphate ion can be determined using any method known in the art, including, for example, ion chromatography. The total theoretical amount of phosphate ion can be calculated from the total amount of bisphosphonic acid groups, partial esters thereof, or salts thereof, which can also be determined using any method known in the art. For example, elemental analysis of the modified pigment (such as by thermal combustion or inductively-coupled plasma, ICP) can be used to measure the total amount of phosphorous of the modified pigment, which can then be used to calculate the amount of bisphosphonic acid groups, partial esters thereof, or salts thereof and, subsequently, the total theoretical amount of phosphate ion. The higher the phosphate release value, the more phosphate ion is produced by the modified pigment at 70° C. over the defined period of time, which is believed to relate to the long term stability of the attached organic group.

The modified pigment of the present invention have a low phosphate release value, which, as used herein, means that the value is below a specified level over a specified period of time at a specified temperature. In particular, the modified pigments of the present invention have a phosphate release value of less than or equal to 1% over 1 week, preferably less than or equal to 2% over 2 weeks, more preferably less than or equal to 3% over 3 weeks, and most preferably, less than or equal to 4% over 4 weeks at 70° C. Thus, without wishing to be bound by theory, the organic groups attached to the pigment of the modified pigment have surprisingly been found to be stable (i.e., do not produce phosphate ions) as a dispersion in a liquid vehicle over time at elevated temperatures.

The modified pigment of the present invention can be in a variety of different forms. For example, the modified pigment may be a dry form, such as a powder, pellet, granule, or cake. As used herein, the term "dry" relating to the form of the modified pigment does not mean substantially free of volatile material. Rather, the term refers to the physical state of the material. Thus, dry forms include forms containing a high level, such as about 50% or more, of a volatile solvent. The dry form may be a material having the consistency of, for example, a paste or putty in a solid or semi-solid form or may be, for example, a free flowing or tacky powder.

The modified pigment of the present invention can also be in the form of a dispersion in a liquid vehicle. The vehicle can be either an aqueous or non-aqueous liquid vehicle, but is preferably a vehicle that contains water. Thus, the vehicle is preferably an aqueous vehicle, which is a vehicle that contains greater than 50% water and can be, for example, water or mixtures of water with water miscible solvents such as alcohols. Non-aqueous vehicles are those that contain less than 50% water or are not miscible with water. For example, the aqueous vehicle may be water. The amount of modified pigment used in the dispersion form can be varied but is typically in an amount ranging from about 0.1% to about 20% based on the weight of the inkjet ink composition. Furthermore, the dispersion may contain suitable additives known in the art that impart desirable properties to the dispersion.

The dispersion can be prepared using any method known in the art. For example, the modified pigment in a dry form may be combined with the liquid vehicle with agitation to produce a stable dispersion. Any equipment known in the art, such as a media or ball mill, or other high shear mixing equipment can be used, and various conventional milling media may also be used. Other methods for forming the dispersion will be known to one skilled in the art.

The modified pigment of the present invention may be used in a variety of different applications, including, for example, plastic compositions, aqueous or non-aqueous inks, aqueous or non-aqueous coatings, rubber compositions, paper compositions and textile compositions. In particular, these modified pigments have been found to be capable of forming stable aqueous dispersions that can be used in various aqueous compositions, including, for example, automotive and industrial coatings, paints, toners, adhesives, latexes, and inks.

The modified pigment of the present invention have been found to be especially useful in ink compositions, and, in particular, inkjet ink compositions. Therefore, the present invention further relates to an inkjet ink composition comprising a liquid vehicle and at least one modified pigment, as described herein. The liquid vehicle can be any of those described above relating to the dispersion form of the modified pigment, but is preferably an aqueous vehicle. The amount of modified pigment used in the inkjet ink composition can be varied but is typically in an amount effective to provide the desired image quality (for example, optical density) without detrimentally affecting the performance of the inkjet ink. For example, typically, the modified pigment will be present in an amount ranging from about 0.1% to about 20% based on the weight of the inkjet ink composition.

The inkjet ink composition of the present invention can be formed with a minimum of additional components (additives and/or cosolvents) and processing steps. However, suitable additives may be incorporated in order to impart a number of desired properties while maintaining the stability of the compositions. For example, additional surface active agents, humectants, drying accelerators, penetrants, biocides, binders, and pH control agents, as well as other additives known in the art, may be added. The amount of a particular additive will vary depending on a variety of factors but generally ranges between 0% and 40%.

Surface active agents may be added to further enhance the colloidal stability of the composition or to change the interaction of the ink with either the printing substrate, such as printing paper, or with the ink printhead. Various anionic, cationic and nonionic surface active agents can be used in conjunction with the ink composition of the present invention, and these may be in solid form or as a water solution.

Representative examples of anionic surface active agents include, but are not limited to, higher fatty acid salts, higher alkyldicarboxylates, sulfuric acid ester salts of higher alcohols, higher alkyl-sulfonates, alkylbenzenesulfonates, alkyl-naphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates, alkyl phosphates, and alkyl phosphonates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad® 19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic surface active agents that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols (such as Surfynol® 420, Surfynol® 440, and Surfynol® 465, available from Air Products), polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.), Brij® Series materials (ICI Americas, Inc.), and Triton® series materials (Union Carbide Company). These nonionic surface active agents can be used alone or in combination with the aforementioned anionic and cationic dispersants.

The surface active agent may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth)acrylic") such as poly (meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth) acrylic acid-(meth)acrylate ester copolymers; styrene-acrylic or methacrylic resins such as styrene-(meth)acrylic acid copolymers, such as the Joncryl line from BASF, Carbomers from Noveon, styrene-(meth)acrylic acid-(meth)acrylate ester copolymers, such as the Joncryl polymers from BASF, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, such as the SMA™ resins from Sartomer that can be hydrolyzed in water, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Polymers, such as those listed above, variations and related materials, that can be used for dispersants and additives in inkjet inks are included in the Tego products from Degussa, the Ethacryl products from Lyondell, the Joncryl polymers from BASF, the EFKA dispersants from Ciba, and the Disperbyk and Byk dispersants from BYK Chemie.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol(2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithiodiethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide including the Discole® series (DKS International); the Jeffamine® series (Huntsman); and the like. Additional examples of water-soluble polymer compounds include various dispersants or surfactants described above, including, for example, styrene-acrylic acid copolymers (such as the Joncryl line from BASF, Carbomers from Noveon), styrene-acrylic acid-alkyl acrylate terpolymers, styrene-methacrylic acid copolymers (such as the Joncryl line from BASF), styrene-maleic acid copolymers (such as the SMA™ resins from Sartomer), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl materials from NSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in inkjet inks are included in the Ethacryl products from Lyondell, the Joncryl polymers from BASF, the NeoCryl materials from NSM Neoresins, and the AC and AS polymers Alberdingk-Boley.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an OH— ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH— ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified to remove impurities and other undesirable free species which can co-exist as a result of the manufacturing process using any method known in the art including, for example, ultrafiltration/diafiltration using a membrane, reverse osmosis, and ion exchange. Also, the inkjet ink compositions can be subjected to a classification step, such as filtration, centrifugation, or a combination of the two methods to substantially remove particles having a size above, for example, about 1.0 micron. In this way, unwanted impurities or undesirable large particles can be removed to produce an inkjet ink composition with good overall properties.

The present invention will be further clarified by the following examples, which are intended to be only exemplary in nature.

EXAMPLES

Examples 1-4

The following examples describe the preparation of modified pigments of the present invention comprising carbon black having attached at least one organic group. For Example 1, the organic group comprises a group having the formula —CO—NH—CH(PO$_3$H$_2$)$_2$ or salts thereof. For Example 2, the organic group comprises a group having the formula —SO$_2$—NH—CH(PO$_3$H$_2$)$_2$ or salts thereof.

Example 1

Aminomethylenebisphosphonate (AMBP) was prepared as shown in Scheme 1 below using one of the following methods.

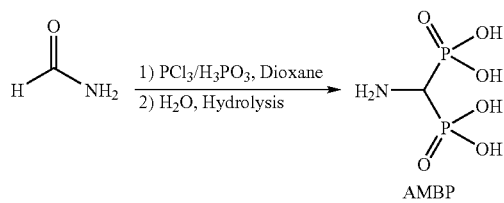

Scheme 1

AMBP

Method A

Phosphorus acid (750 g, 9.15 moles, 1.6 equiv) was charged into a reactor provided with mechanical stirrer, condenser with a guard tube, water condenser, thermometer and addition funnel under a nitrogen atmosphere. To this was added 1,4-dioxane (1.5 L) followed by formamide (250 g, 5.56 moles, 1 equiv) with stirring. The nitrogen atmosphere was removed, and the mixture was warmed to 60° C. for 1 hour and then cooled back to 20° C. Phosphorus trichloride (1.5 L, 17.19 moles, 3.1 equiv) was added to the mixture over a period of 3 hours, and the resulting mixture was then heated to 60° C. for 3 hours. During the heating, the reaction mixture turned into a white sticky mass, which was difficult to stir towards the end. Heating and stirring was discontinued, and the reaction mixture was allowed to stand at room temperature overnight. After removing the liquid phase by decanting, water (2.5 L) was added to the reaction mass for the hydrolysis, and this was then heated to reflux for 4 hours. The reaction mixture was cooled to room temperature, filtered, washed with methanol (2.5 L), and dried under vacuum, yielding AMBP as a white solid (540g, 51% yield). $^1$HNMR data for this compound (D$_2$O/NaOH) was as follows: 2.56 (t, 1H, J=16.4 Hz). LC-MS data for this compound was as follows: 190 [M−1].

Method B

To a stirred mixture of formamide (500 g, 11.11 mol) and phosphorus acid (800 g, 9.75 mol) in a 20L multi-neck round bottom flask fitted with an overhead mechanical stirrer, water condenser with guard tube, thermometer, and a liquid addition funnel was added deionized water (600 mL, 33.33 mol). The mixture was cooled to 10° C. in an ice water bath, and to this was added 0.5 L of phosphorus trichloride (note: the addition of phosphorus trichloride to water is exothermic) over a period of 3 hours followed by another addition of 0.5 L of phosphorus trichloride over a period of 30 minutes at a temperature of below 20-25° C. When all of the water was consumed, the temperature dropped to below 10° C., and to this was added 2.5L of phosphorus trichloride over a period of 15 minutes (total phosphorus trichloride addition was 3.5 L, 40 mol). To control the frothing, the stirrer was lifted up in the flask and stirred at a higher rate. Then the reaction mixture was warmed to 60° C. in 2 to 2.5 hr and continued at that temperature until the reaction mass solidified and could not stir further (approximately 1 hour after reaching 60° C.). Heating and stirring was discontinued, and the reaction mixture was left as is overnight for slow cooling to 40° C. Any remaining excess phosphorus trichloride was decanted off, and 1 L demineralized water was added to the reaction mixture over a period of 4 hours under nitrogen (heat evolution of this quenching process was controlled by portion-wise addition of water to avoid the presence of excess water, which may react violently). The reaction mixture was stirred for 0.5 hour, and then another 4 L demineralized water was added and heated to reflux for 6 hours. The resulting mixture was allowed to cool to 35° C. overnight and was then filtered, washed with 2 L deionized water followed by 2 L acetone, and dried at reduced pressure overnight, yielding AMBP as a white solid (830 g, 39% yield). $^1$H NMR data for this compound (400 MHz, D$_2$O—NaOH) was as follows: 2.56 (t, 1H, J=16.4 Hz). LC-MS data for this compound was as follows: 190 [M−1]

AMBP was reacted with 4-nitrobenzoylchloride as shown in Scheme 2 below.

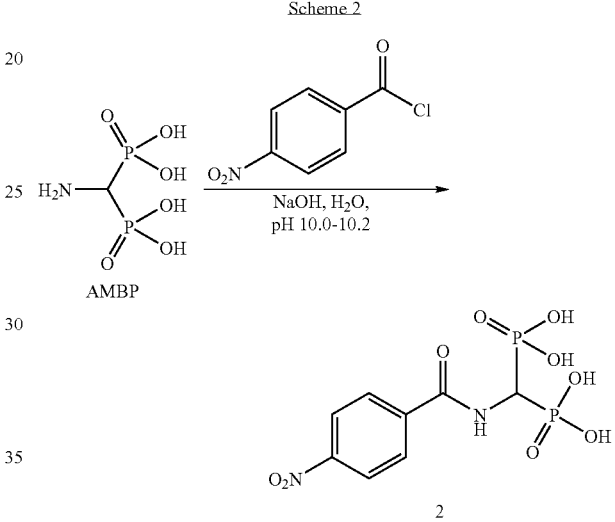

Scheme 2

AMBP

2

A mixture of p-nitrobenzoic acid (500 g, 3.0 moles, 1 equiv) and thionyl chloride (600 mL, 8.2 moles, 2.73 equiv) was heated to reflux for 6-7 hours until a clear solution was obtained. Excess of thionyl chloride was removed by distillation followed by co-distillation with toluene (300 mL). The reaction mass was cooled to room temperature, and hexane (1.5 L) was added, forming a precipitate, which was then filtered and dried under vacuum, yielding 4-nitrobenzoyl chloride as a yellow solid (530 g, approximately 100% yield), which was used without any further purification.

AMBP (450 g, 2.35 moles, 1 equiv) was suspended in de-ionized water (9 L). To this was added a 10N aqueous sodium hydroxide solution to adjust the pH to 10.0. To this was then added all of the previously prepared 4-nitrobenzoyl chloride portion wise over a period of 1 hour, while maintaining the reaction pH at 10.1-10.2 by addition of the 10N aqueous sodium hydroxide as needed. After the addition was complete, the reaction mixture was warmed to 60-65° C. in a preheated oil bath. The pH was maintained at 10.0 by continued addition of the 10N aqueous NaOH solution until no further drop in pH was observed. After 1.5 hours of heating, the reaction mixture was cooled to room temperature and filtered. The pH of the filtrate was adjusted to 3.9 by addition of a 5N aqueous HCl solution, and the resulting precipitate, containing mostly p-nitrobenzoic acid, was removed by filtration. The filtrate (which contained Compound 2 with approximately 9% p-nitrobenzoic acid) was used without further purification.

The filtrate containing Compound 2 was reacted as shown in Scheme 3 below.

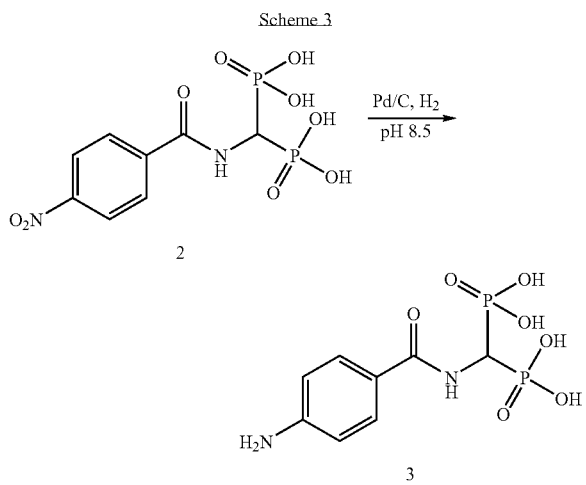

The pH of the filtrate was adjusted to 8.5 by addition of a 10N aqueous NaOH solution. To this was added 5% Pd/C (50% wet, 16 g, 1 wt % assuming 800 g of Compound 2 in the filtrate). The mixture was hydrogenated in a Parr shaker at 6 Kg/cm$^2$ hydrogen pressure at room temperature until no further pressure decrease was observed. The pressure was released, and the reaction mixture was filtered through a celite bed. The pH of the filtrate was adjusted to 1.5 by addition of a 5N aqueous HCl solution. The resulting precipitate was isolated by filtration and washed successively with 1:1 methanol-water, methanol, and finally with acetone. The resulting product was dried at reduced pressure overnight, yielding Compound 3 as a white solid (600g, 82% yield). $^1$H NMR (400 MHz) data for this compound (D$_2$O) was as follows: 7.73 (d, 2H, J=8.4 Hz), 6.88 (d, 2H, J=8.4 Hz), 4.29 (t, 1H, J=18.8 Hz). $^{13}$C NMR (100 MHz) data for this compound (D$_2$O) was as follows: 171.1, 153.2, 131.9, 127.2, 118.3 and 53.9(t). LC-MS data for this compound was as follows: 309 [M−1].

Dispersions comprising modified pigments of the present invention were prepared using one of the following general procedures. The method, specific pigment types, and specific amounts of Compound 3 (treatment level, mmoles of Compound 3 per gram of carbon black) are shown in Table 1 below.

TABLE 1

| Ex # | Method | Pigment | Treatment Level (mmols/g) |
|---|---|---|---|
| 1A | A | BP1000 | 0.75 |
| 1B | A | BP700 | 0.75 |
| 1C | B | BP880 | 0.25 |
| 1D | B | BP880 | 0.35 |
| 1E | B | BP880 | 0.50 |

In Table 1, BP1000 is Black Pearls® 1000 carbon black (a carbon black having a BET surface area of 343 m$^2$/g and a DBPA of 105 mL/100 g), BP700 is Black Pearls® 700 carbon black (a carbon black having a BET surface area of 200 m$^2$/g and a DBPA of 117 mL/100 g), and BP880 is Black Pearls® 880 carbon black (a carbon black having a BET surface area of 220 m$^2$/g and a DBPA of 105 mL/100 g), each available from Cabot Corporation.

Method A 20 g of a carbon black, 20 mmol of Compound 3 and 200 mL of DI water were mixed with a Silverson mixer (6000 rpm) at room temperature. If the pH of the resulting slurry was greater than 4, 20 mmol of nitric acid was also added. After 30 min, sodium nitrite (20 mmol) in a small amount of water was added slowly into the mixture. The temperature reached 60° C. through mixing, and this was allowed to proceed for 1 hour. A modified pigment of the present invention was produced. The pH was adjusted to 10 with a NaOH solution. After 30 min, the resulting dispersion of the modified pigment, comprising a pigment having attached at least one geminal bisphosphonic acid group or salts thereof, was diafiltered with a Spectrum membrane using 20 volumes of DI water and concentrated to approximately 12% solids and sonicated for 30 min to achieve a desired particle size.

Method B

A ProcessA11 4HV Mixer (4 liter) was charged with 500 g of dry carbon black, 1 L of DI water, and Compound 3. The resultant mixture was then heated to 60° C. while intensely mixing at 300 RPM for 10 minutes. To this was added a 20% aqueous sodium nitrite solution (1 molar equivalent based on the amount of Compound 3) over 15 minutes. Heating and mixing was continued for a total of 3 hours. The contents of the mixer were removed by diluting with an additional 750 mL of DI water, and the resulting dispersion the modified pigment was then purified by diafiltration using DI water. At the end of the diafiltration (permeate conductivity<200 micro siemens) the concentration of modified pigment in the dispersion was adjusted to 15% and then centrifuged in a Carr Continuous Centrifuge (PilotFuge).

For each dispersion, the sodium content was measured with an Orion Ion Selective Electrode, and the results, expressed on a solid basis, are shown in Table 2 below. Also, the total amount of phosphorous was measured by elemental analysis, and the results, expressed as a weight percent, are also shown in Table 2 below. Also shown are the mean volume particle sizes (mV) of the modified pigment in the dispersions, measured using a Microtrac® Particle Size Analyzer.

TABLE 2

| Ex # | Particle Size (nm) | Na (ppm) | % P |
|---|---|---|---|
| 1A | 120 | 27868 | 2.31 |
| 1B | 145 | 20658 | 2.25 |
| 1C | 106 | 11608 | 1.34 |
| 1D | 102 | 14621 | 1.54 |
| 1E | 104 | 19940 | 2.20 |

Example 2

Compound 4 was prepared from AMBP using the procedure described in Example 1, with the exception that 4-nitrobenzenesulfonyl chloride was used in place of 4-nitrobenzoyl chloride. The reaction is shown in Scheme 4 below.

Scheme 4

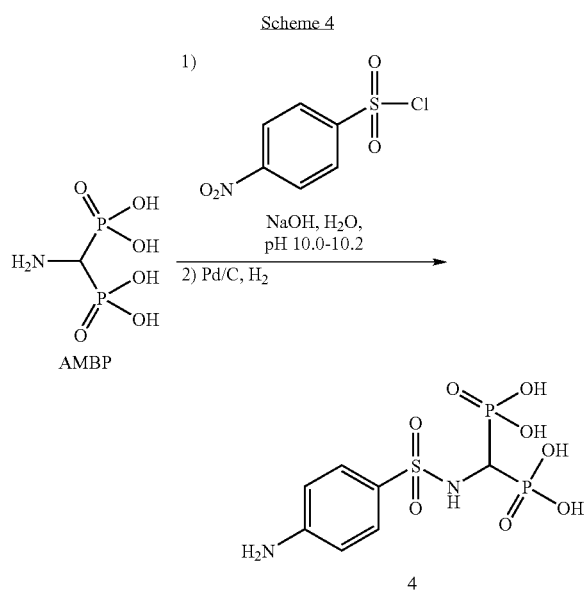

Thus, to a suspension of 375 g of AMBP (1.96 mmol) in 3 L deionized water was added a 10 N NaOH solution (600 ml). The addition was done rapidly in order to dissolve the AMBP at ambient temperature (reaction temperature was observed to increase to 40° C.). Then, the pH of the reaction mixture was adjusted to 9.9 by using a 10 N NaOH solution. 4-Nitrobenzenesulfonyl chloride was added to this portion-wise over a period of 1.5 hours, maintaining the pH at 9.75-9.9 by adding a 10 N NaOH solution as needed. The reaction temperature was observed to increase to 48-50° C. at the end of the addition, and stirring was continued for another 30 minutes at this temperature until the pH was steady at 9.8. $^1$H NMR analysis of the mixture showed 52% conversion. The reaction mixture was filtered hot, cooled to 40° C., and the pH of the filtrate was adjusted to 1.3 by adding 500 ml of concentrated HCl. This was further cooled to 15-20° C. in ice-water bath and stirred for 1.5-2 hours and left overnight. The resulting precipitated solid was filtered, washed with 2 L of methanol followed by 2 L of acetone, and dried under reduced pressure to obtain the desired product having a $^1$H NMR purity of approximately 55%. To the residual mother liquor was added an equal volume (5.5 L) of methanol. This was stirred for 1 hour, and the resulting precipitated solid was filtered, washed with 1 L methanol followed by 1 L acetone, and dried under reduced pressure to obtain additional product, which had a $^1$HNMR purity of approximately 45%. The two batches of solids were combined, yielding the desired nitrobenzylsulfonamide as a white solid (approximately 700 g having a purity of approximately 50%), which was used as is for the hydrogenation step. $^1$HNMR data for this compound (400 MHz, D$_2$O—NaOH) was as follows: 8.38 (2H, d, 8 Hz), 8.12 (2H, d, 8 Hz), 3.79 (1H, t, 20 Hz) and 2.6 (1H, t, 17.6 Hz).

The sulfonamide product was suspended over deionized water (3 L) and stirred for 5 minutes. Any insoluble starting material was removed by filtration (70 g). To the filtrate was added 120 mL of a 10 N NaOH solution in order to adjust the pH to 8.5. To this solution was added 5% Pd/C (50% by weight), and the mixture was hydrogenated at 10 kg/sqcm H$_2$ pressure for 3 hours at room temperature. $^1$H NMR analysis of the reaction mixture showed the absence of starting material. The reaction mixture was filtered through celite, and the pH of the filtrate was readjusted to 0.95 by addition of 200 mL of 10 N HCl. The resulting precipitate was filtered, washed with water (1 L) followed by acetone (1 L), and dried under reduced pressure at 60° C., yielding Compound 4 as a white solid (180 g, 88% yield). $^1$H NMR data for this compound (400 MHz, D$_2$O/NaOH) was as follows: 7.73 (2H, d, 8.8 Hz), 6.79 (2H, d, 8.8 Hz), 3.45 (1H, t, 18.4 Hz). $^{13}$C NMR data for this compound (400 MHz, D$_2$O/NaOH): 152.5, 131.1, 130.7, 116.3 and 55.1(t). LC-MS data for this compound was as follows: 345 [M−23].

A dispersion of a modified pigment of the present invention was prepared using Method B, described in Example 1 above, using CB-C as the pigment and Compound 4 at a treatment level of 0.35 mmoles of Compound 4 per gram of carbon black. Particle size, sodium content, and total amount of phosphorous for this modified pigment are shown in Table 3 below.

TABLE 3

| Ex # | Particle Size (nm) | Na (ppm) | % P |
|---|---|---|---|
| 2 | 114 | 12792 | 1.08 |

Example 3

A dispersion of a modified carbon black pigment was prepared using the procedure described in Example 12 of U.S. Patent Application Publication No. 2007/0100024, with the exception that the treatment level was 0.5 mmoles/g.

Example 4

Dispersions of modified pigments of the present invention were prepared using Method A described in Example 1, with the exception that the pigment used was either Pigment Red 122 (PR122) or Small Particle Pigment Red 122(PR122sp), both available from Sun Chemical. The specific pigments and treatment levels are shown in Table 4 below, along with the resulting sodium levels.

TABLE 4

| Ex # | Pigment | Treatment Level (mmols/g) | Particle Size (nm) | Na (ppm) | % P |
|---|---|---|---|---|---|
| 4A | PR122 | 0.5 | 131 | 5188 | 0.29 |
| 4B | PR122 | 1.0 | 133 | 6068 | 0.38 |
| 4C | PR122sp | 0.5 | 111 | 4794 | 0.25 |
| 4D | PR122sp | 1.0 | 115 | 7124 | 0.41 |

Comparative Examples 1-5

Comparative dispersions of modified pigments were prepared, each comprising a pigment having attached two phosphonic acid groups or salts thereof. The modified pigment dispersions were prepared using the procedures described in U.S. Patent Application Publication No. 2007/0100024. In particular, the modified pigment dispersion of Comparative Example 1 was prepared as described in Example 88 of this publication, with the exception that Black Pearls® 880 carbon black (BP880 shown above) was used as the pigment and the treatment levels were 0.6 mmoles/g (for Comparative Example 1A), 0.7 mmoles/g (for Comparative Example 1B), and 1.0 mmoles/g (for Comparative Example 1C). The modified pigment dispersion of Comparative Example 2 was prepared as described in Example 72B of this publication, with the exception that Pigment Red 122 (PR122 shown above) was used as the pigment. The modified pigment dispersion of Comparative Example 3 was prepared as described in Example 7a of this publication, and the treatment level was 1.7 mmoles/g. The modified pigment dispersion of Comparative Example 4 was prepared as described in Example 10 of this publication, and the treatment level was 0.5 mmoles/g. Finally, the modified pigment dispersion of Comparative Example 5 was prepared as described in Example 11 and Example 13 of this publication, and the treatment level was 0.5 mmoles/g.

Examples 5-11 and Comparative Examples 6-8

The following examples describe the preparation and print performance properties of inkjet ink compositions. Examples 5-11 are inkjet ink compositions of the present invention while Comparative Examples 6-8 describe comparative inkjet ink compositions. The specific pigments used in each composition are shown in Table 5 below.

TABLE 5

| Example # | Pigment |
|---|---|
| Ex. 5 | Ex. 1B |
| Ex. 6 | Ex. 1C |
| Ex. 7 | Ex. 1E |
| Ex. 8 | Ex. 4A |
| Ex. 9 | Ex. 4B |
| Ex. 10 | Ex. 4C |
| Ex. 11 | Ex. 4D |
| Comp. Ex. 6 | Comp. Ex. 3 |
| Comp. Ex. 7 | Comp. Ex. 1 |
| Comp. Ex. 8 | Comp. Ex. 2 |

Inkjet ink compositions were prepared using the formulation shown in Table 6 below (percentages are by weight).

TABLE 6

| Ingredient | Amount |
|---|---|
| Glycerol | 7% |
| diethylene glycol | 5% |
| 1,2,3-trimethylolpropane | 7% |
| Surfynol 465 | 1% |
| Pigment | 4% |
| Water | 76% |

For Examples 5 and 8-11, as well as Comparative Examples 6 and 8, the amount of pigment was achieved by measuring and matching the UV-Vis value at 550 nm and thus represent a percent loading of pigment (without consideration to the weight of attached groups). For Examples 6 and 7 and Comparative Example 7, the amount of pigment used was based on solids and thus includes the weight of the attached groups.

The inkjet ink compositions were printed using a Canon iP4000 printer. Images were printed on a variety of different types of plain paper, including Hammermill Inkjet (HMI), Hammermill Copy Plus (HCP), Hewlett Packard multi-purpose printing paper (HPMP), Hewlett Packard printing paper (HPPP), Xerox 4200 (X4200), and Canon Extra Multifunctional Paper (CEMP). The optical density (OD, or visual density) of a solid area fill at maximum print density was measured using ImageXpert™. Four measurements of OD are performed on 3 replicate prints of each type of paper, and an average for each paper was calculated. Also, an average OD was calculated across all papers used. The results are shown in Tables 7a, 7b, and 7c below.

TABLE 7a

| Example # | HMI | HCP | HPMP | HPPP | X4200 | Average |
|---|---|---|---|---|---|---|
| Ex 5 | 1.37 | 1.44 | 1.63 | 1.63 | 1.45 | 1.50 |
| Comp Ex 6 | 1.27 | 1.38 | 1.57 | 1.57 | 1.37 | 1.43 |

TABLE 7b

| Example # | HCP | HPMP | X4200 | CEMP | Average |
|---|---|---|---|---|---|
| Ex 6 | 1.26 | 1.55 | 1.30 | 1.13 | 1.31 |
| Ex 7 | 1.28 | 1.50 | 1.29 | 1.17 | 1.31 |
| Comp Ex 7 | 1.26 | 1.52 | 1.27 | 1.13 | 1.29 |

TABLE 7c

| Example # | HCP | HPMP | X4200 | CEMP | Average |
|---|---|---|---|---|---|
| Ex 8 | 1.12 | 1.27 | 1.11 | 1.04 | 1.13 |
| Ex 9 | 1.11 | 1.19 | 1.10 | 1.00 | 1.11 |
| Ex 10 | 1.08 | 1.19 | 1.06 | 0.99 | 1.08 |
| Ex 11 | 1.08 | 1.18 | 1.07 | 1.01 | 1.08 |
| Comp Ex 8 | 1.11 | 1.25 | 1.09 | 1.00 | 1.11 |

As the results in these tables show, the optical density of images produced from inkjet ink compositions of the present invention have similar optical density than those of the comparative inkjet ink compositions. These inkjet inks also printed well. Thus, the modified pigments of the present invention can be used to prepare inkjet ink compositions having desirable performance properties. Additional properties are described in Example 12 below.

Example 12

The thermal stability of 15% aqueous dispersion of each the modified pigments of the present invention was also assessed. It was found that the dispersions of the present invention were stable at both room temperature and at 70° C. (over 4-6 weeks), with less than 10% change in particle size and viscosity at 15% solids.

Furthermore, phosphate release values were also determined for each of these aqueous dispersions. Each 15% solids dispersion was held at 70° C., and the amount of phosphate ion produced over time was determined by spinning down samples of the dispersions at ultrahigh speed centrifugation and measuring the amount of phosphate ion in the supernatant by ion chromatograph (IC). The amount of phosphate ion released as a percentage of the theoretical total amount of phosphate ion that can be produced, calculated from the phosphorus content of the modified pigments (measured by elemental analysis) is the phosphate release value. The results are shown in Table 8 below

TABLE 8

| Example # | Start | 1 week | 2 weeks | 3 weeks | 4 weeks |
|---|---|---|---|---|---|
| Ex 1C | 0.1% | 0.3% | 0.6% | 1.0% | 1.6% |
| Ex 1E | 0.1% | 0.4% | 0.7% | 1.2% | 1.9% |
| Ex 2 | 0.1% | 0.9% | | | |
| Ex 3 | 0.1% | 0.7% | 1.7% | 2.9% | 3.0% |
| Comp Ex 1A | 0.1% | 2.9% | 4.9% | 7.3% | 9.2% |
| Comp Ex 1B | 0.1% | 2.2% | 3.9% | 6.0% | 8.0% |

TABLE 8-continued

| Example # | Start | 1 week | 2 weeks | 3 weeks | 4 weeks |
|---|---|---|---|---|---|
| Comp Ex 1C | 0.1% | 1.8% | 2.8% | 3.9% | 5.2% |
| Comp Ex 3 | 0.1% | 2.6% | 4.2% | 6.0% | 7.8% |
| Comp Ex 4 | 2.4% | 9.2% | 16.7% | 22.2% | 25.9% |
| Comp Ex 5 | 0.6% | | 16.2% | | 21.7% |

As the data shows, each of the modified pigments of the present invention have substantially lower phosphate release values at each time interval than the comparative modified pigments. The concentration of ions, including phosphate ions, in solution is expected to have a negative impact on the printing performance. For example, inkjet ink compositions having higher phosphate ion concentrations would be expected to have increased conductivity which would be expected to cause printing problems in certain types of cartridge/print systems. In addition, if the phosphate ions result from the attached organic groups, loss of phosphonic acid groups or salts thereof would be expected to impact the stability of the pigment dispersion, leading to a loss in print reliability. Thus, the inkjet ink compositions of the present invention, comprising modified pigments of the present invention, have been found to have surprisingly low phosphate release values while, at the same time, produce printed images with good print properties, such as optical density. Thus, the inkjet ink compositions of the present invention have improved properties compared to the comparative inkjet ink compositions.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising a liquid vehicle and at least one modified pigment comprising a pigment having attached at least one organic group, wherein the organic group comprises at least one group having the formula $-CO-Q-CH(PO_3H_2)_2$, partial esters thereof, or salts thereof, wherein Q is O, S, or NR' and R' is H, a C1-C18 alkyl group, a C1-C18 acyl group, an aralkyl group, an alkaryl group, or an aryl group.

2. The inkjet ink composition of claim 1, wherein Q is NH.

3. The inkjet ink composition of claim 1, wherein the organic group has the formula $-X-CO-Q-CH(PO_3H_2)_2$, partial esters thereof, or salts thereof, wherein X, which is attached to the pigment, is an arylene, heteroarylene, alkylene, alkarylene, or aralkylene group.

4. The inkjet ink composition of claim 3, wherein X is an arylene group.

5. The inkjet ink composition of claim 3, wherein Q is NH.

6. The inkjet ink composition of claim 1, wherein the organic group is a $-C_6H_4-CONHCH(PO_3H_2)_2$ group, partial esters thereof, or salts thereof.

7. The inkjet ink composition of claim 1, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

8. The inkjet ink composition of claim 1, wherein the pigment is carbon black.

9. The inkjet ink composition of claim 1, wherein the modified pigment has a phosphate release value of less than or equal to 2% after 2 weeks at 70° C.

10. The inkjet ink composition of claim 1, wherein the modified pigment has a phosphate release value of less than or equal to 3% after 3 weeks at 70° C.

11. The inkjet ink composition of claim 1, wherein the modified pigment has a phosphate release value of less than or equal to 4% after 4 weeks at 70° C.

12. The inkjet ink composition of claim 1, wherein the liquid vehicle is an aqueous vehicle.

13. An inkjet ink composition comprising a liquid vehicle and at least one modified pigment comprising a pigment having attached at least one organic group, wherein the organic group comprises at least one group having the formula $-SO_2-Q-CH(PO_3H_2)_2$, partial esters thereof, or salts thereof, wherein Q is O, S, or NR' and R' is H, a C1-C18 alkyl group, a C1-C18 acyl group, an aralkyl group, an alkaryl group, or an aryl group.

14. The inkjet ink composition of claim 13, wherein Q is NH.

15. The inkjet ink composition of claim 13, wherein the organic group has the formula $-X-SO_2-Q-CH(PO_3H_2)_2$, partial esters thereof, or salts thereof, wherein X, which is attached to the pigment, is an arylene, heteroarylene, alkylene, alkarylene, or aralkylene group.

16. The inkjet ink composition of claim 15, wherein X is an arylene group.

17. The inkjet ink composition of claim 15, wherein Q is NH.

18. The inkjet ink composition of claim 13, wherein the organic group is a a $-C_6H_4-SO_2NHCH(PO_3H_2)_2$ group, partial esters thereof, or salts thereof.

19. The inkjet ink composition of claim 13, wherein the liquid vehicle is an aqueous vehicle.

20. A modified pigment comprising a pigment having attached at least one organic group, wherein the organic group comprises at least one group having the formula $-CO-Q-CH(PO_3H_2)_2$, partial esters thereof, or salts thereof, wherein Q is O, S, or NR' and R' is H, a C1-C18 alkyl group, a C1-C18 acyl group, an aralkyl group, an alkaryl group, or an aryl group.

21. The modified pigment of claim 20, wherein Q is NH.

22. The modified pigment of claim 20, wherein the organic group has the formula $-X-CO-Q-CH(PO_3H_2)_2$, partial esters thereof, or salts thereof, wherein X, which is attached to the pigment, is an arylene, heteroarylene, alkylene, alkarylene, or aralkylene group.

23. The modified pigment of claim 22, wherein X is an arylene group.

24. The modified pigment of claim 22, wherein Q is NH.

25. The modified pigment of claim 20, wherein the organic group is a $-C_6H_4-CONHCH(PO_3H_2)_2$ group, partial esters thereof, or salts thereof.

26. The modified pigment of claim 20, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

27. The modified pigment of claim 20, wherein the pigment is carbon black.

28. The modified pigment of claim 20, wherein the modified pigment is in the form of a dispersion in a liquid vehicle.

29. The modified pigment of claim 28, wherein the liquid vehicle is an aqueous vehicle.

30. The modified pigment of claim 28, wherein the modified pigment has a phosphate release value of less than or equal to 1% after 1 week at 70° C.

31. The modified pigment of claim 28, wherein the modified pigment has a phosphate release value of less than or equal to 2% after 2 weeks at 70° C.

32. The modified pigment of claim 28, wherein the modified pigment has a phosphate release value of less than or equal to 3% after 3 weeks at 70° C.

33. The modified pigment of claim 28, wherein the modified pigment has a phosphate release value of less than or equal to 4% after 4 weeks at 70° C.

34. A modified pigment comprising a pigment having attached at least one organic group, wherein the organic group comprises at least one group having the formula $-SO_2$-Q-$CH(PO_3H_2)_2$, partial esters thereof, or salts thereof, wherein Q is O, S, or NR' and R' is H, a C1-C18 alkyl group, a C1-C18 acyl group, an aralkyl group, an alkaryl group, or an aryl group.

35. The modified pigment of claim 34, wherein the modified pigment has a phosphate release value of less than or equal to 2% after 2 weeks at 70° C.

36. The modified pigment of claim 34, wherein the modified pigment has a phosphate release value of less than or equal to 3% after 3 weeks at 70° C.

37. The modified pigment of claim 34, wherein the modified pigment has a phosphate release value of less than or equal to 4% after 4 weeks at 70° C.

38. The inkjet ink composition of claim 1, wherein the modified pigment has a phosphate release value of less than or equal to 1% after 1 week at 70° C.

39. The modified pigment of claim 34, wherein the organic group has the formula $-X-SO_2$-Q-$CH(PO_3H_2)_2$, partial esters thereof, or salts thereof, wherein X, which is attached to the pigment, is an arylene, heteroarylene, alkylene, alkarylene, or aralkylene group.

40. The modified pigment of claim 39, wherein X is an arylene group.

41. The modified pigment of claim 39, wherein Q is NH.

42. The modified pigment of claim 34, wherein the organic group is a $-C_6H_4-SO_2NHCH(PO_3H_2)_2$ group, partial esters thereof, or salts thereof.

43. The modified pigment of claim 34, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

44. The modified pigment of claim 34, wherein the pigment is carbon black.

45. The modified pigment of claim 34, wherein the modified pigment is in the form of a dispersion in a liquid vehicle.

46. The modified pigment of claim 34, wherein the modified pigment has a phosphate release value of less than or equal to 1% after 1 week at 70° C.

47. The modified pigment of claim 45, wherein the liquid vehicle is an aqueous vehicle.

* * * * *